United States Patent [19]

Chikamatsu et al.

[11] Patent Number: 5,309,944
[45] Date of Patent: May 10, 1994

[54] ELECTROMAGNETIC PROPORTIONAL PRESSURE REDUCING VALVE

[75] Inventors: Satoshi Chikamatsu; Noboru Kurita, both of Kani; Koji Morita; Yoshiyuki Eto, both of Yokohama, all of Japan

[73] Assignees: Kayaba Kogyo Kabushiki Kaisha; Nissan Motor Co., Ltd., both of Yokohama, Japan

[21] Appl. No.: 64,198

[22] Filed: May 19, 1993

[30] Foreign Application Priority Data

May 19, 1992 [JP] Japan ................................. 4-126408

[51] Int. Cl.$^5$ ........................................... F15B 13/044
[52] U.S. Cl. .................... 137/625.65; 91/433; 251/69; 251/129.08; 251/129.1
[58] Field of Search ............... 91/433; 137/625.65; 251/69, 129.08, 129.1

[56] References Cited

U.S. PATENT DOCUMENTS 3,807,441  4/1974  Grosseau ............. 137/625.65 X
4,250,922  2/1981  Will et al. ............. 137/625.65

Primary Examiner—Gerald A. Michalsky
Attorney, Agent, or Firm—Foley & Lardner

[57] ABSTRACT

This invention relates to a pressure reducing valve wherein a spool is driven axially by a first plunger which moves according to the magnetization state of a first solenoid, and a control port is connected to a supply port and a tank port according to the axial position of this spool. The pressure of the control port acts on the spool in the opposite direction to that of the plunger via a feedback passage, and the pressure increases or decreases according to the current flowing through the first solenoid. According to this invention, a second plunger is arranged in series with the first plunger, and a spring tends to push the second plunger toward the first plunger. A second magnetized solenoid however keeps the second plunger held back against the restoring force of the spring so that it is not in contact with the first plunger, and releases the second plunger so that it pushes the first plunger when the current fails. Hence, even if the current supplied to the first and second solenoids is cut off, the control port maintains the predetermined pressure, and a fail-safe mechanism is realized by means of a simple construction.

3 Claims, 5 Drawing Sheets

ELECTROMAGNETIC PROPORTIONAL PRESSURE REDUCING VALVE

FIELD OF THE INVENTION

This invention relates to the fail-safe function of an electromagnetic proportional pressure reducing valve.

BACKGROUND OF THE INVENTION

An electromagnetic pressure reducing valve, as shown in FIG. 5 for example, comprises a solenoid 8 which causes a spool 1 to slide for connecting a control port 4 to either a supply port 5 or a tank port 6 depending on the slide position.

The spool 1 is inserted such that it is free to slide in a hole 2a in a valve housing 2. The control port 4, supply port 5 connected to an oil source P and tank port 6 connected to a tank T open into this cavity, and a feedback oil passage 3 which branches off the control port 4 enables a pressure Pc of the control port 4 to be applied to one end 1a of the spool 1.

The solenoid 8 is housed in a case 10 connected to the valve housing 2, and a plunger 9 is made to support the opposite end 1b of the spool 1 according to the magnetization state of the solenoid 1. When an electric current is passed through the solenoid 8, the solenoid 8 is magnetized, and the plunger 9 is thereby pulled toward a base 7 of the case 10 so as to push the spool 1 towards the left of the figure. The pushing force in this case is proportional to the magnetizing current flowing through the solenoid 8.

Small gaps exist between the hole 2a and the spool 1 so that the control port 4, supply port 5 and tank port 6 are interconnected. The lengths $S_1$ and $S_2$ of these gaps in the axial direction vary according to the position of the spool 1, however $S_1+S_2$ is always constant.

The pressure Pc generated in the control port 4 varies according to the ratio of $S_1$ and $S_2$. For example, when $S_1$ is small and $S_2$ is large, the pressure Pc increases.

If a current $i_1$ is supplied to the solenoid 8, a driving force $F_1$ acts on the spool 1 tending to push it toward the left of the figure. Further, as the pressure Pc acts on the left end of the spool 1 via the feedback oil passage 3, a pushing force $F_2$ based on this pressure Pc acts on the spool 1 in a right hand direction. If the pressure receiving surface area of the spool 1 is Aa, this pushing force is given by:

$$F_2 = Pc \times Aa \quad (1)$$

The spool 1 is thus held in a position at which the driving force $F_1$ due to the solenoid 8 and the pushing force $F_2$ acting in the reverse direction are balanced. The driving force $F_1$ is proportional to the electric current $i_1$ flowing through the solenoid 8, while the pushing force $F_2$ is proportional to the pressure Pc generated by the control port 4. In the balanced state:

$$Pc = F_1/Aa \quad (2)$$

The pressure Pc is therefore proportional to the current $i_1$ flowing through the solenoid 8. In other words, if the magnetizing current flowing through the solenoid 8 increases or decreases, the spool driving force $F_1$ of the plunger 9 varies, so the spool is displaced to a position at which the pushing force $F_2$ is in equilibrium with it, and the ratio of $S_1$ to $S_2$ varies. By varying the ratio of $S_1$ to $S_2$ in this manner, a high pressure supplied to the supply port 5 is reduced to an arbitrary control pressure Pc.

However, if in such an electromagnetic proportional reducing valve the current flowing through the solenoid 8 is interrupted for some reason, the spool driving force $F_1$ of the plunger 9 drops to zero, the spool moves to the right of the figure as far as it can, and the control pressure Pc falls to the pressure Pr of the tank port 6.

If the magnetizing current $i_1$ is interrupted due to a fault when a hydraulic actuator 20 is supporting a load due to the pressure Pc, the control port 4 is no longer to maintain the pressure, and the hydraulic actuator 20 shortens. If the actuator 20 is used in a hydraulic unit for distributing the driving force in a torque split type four-wheeled vehicle and power is no longer supplied to the solenoid 8 due to a fault in the electric circuit, therefore, four-wheeled drive becomes impossible.

To prevent this, another pressure valve could be provided for the event of an oil pressure emergency situation, but this would make the hydraulic circuit more complex and inevitably lead to greater cost.

Alternatively, the plunger 9 could be pulled toward the spool 1 by a spring so that even if the spool driving force $F_1$ dropped to zero when the solenoid magnetizing current $i_1$ was interrupted, the control port 4 maintained a certain minimum pressure, but in this case it would no longer be possible by ordinary means to set the pressure Pc of the control port 4 below this minimum level.

SUMMARY OF THE INVENTION

It is therefore an object of this invention to maintain a predetermined control pressure when the solenoid magnetizing current in an electromagnetic proportional pressure reducing valve is interrupted due to a fault or to other circumstances.

It is a further object of this invention to maintain the aforesaid control pressure when the magnetizing current is accidentally interrupted.

It is a further object of this invention to implement the aforesaid fail-safe mechanism by means of a simple and economical construction.

It is yet another object of this invention to maintain the minimum pressure of a torque split actuator fitted to a four wheel drive vehicle when the electrical system is faulty, and thereby, to maintain the four wheel driving state of the vehicle.

In order to achieve the above object, this invention provides a pressure reducing valve comprising a supply port connected to an oil source, a tank port connected to a tank, a control port connected to a hydraulic actuator, a spool connecting the control port to the tank port depending on its axial position, a first plunger in contact with one end of the spool, a first solenoid which drives the first plunger axially by means of a driving force according to an magnetizing current provided, and a feedback oil passage for applying the pressure of the control port to the opposite end of the spool, wherein the pressure generated by the control port is increased and decreased according to the magnetizing current of the first solenoid. This valve further comprises a second plunger arranged in series with the first plunger, a spring which pushes the second plunger in the direction of the first plunger, and a second solenoid for pulling the second plunger in opposition to the restoring force of the spring such that it is not in contact with the first plunger when the second solenoid is magnetized.

It is preferable that the feedback passage is formed in the spool.

It is also preferable that the valve further comprises a pin having a pressure receiving surface area smaller than that of the spool which receives pressure from the feedback passage so as to support the opposite end of the spool.

The details as well as other features and advantages of this invention are set forth in the remainder of the specification and are shown in the accompanying drawings.

DESCRIPTION OF THE PREFERRED EMBODIMENTS

Figure 1:
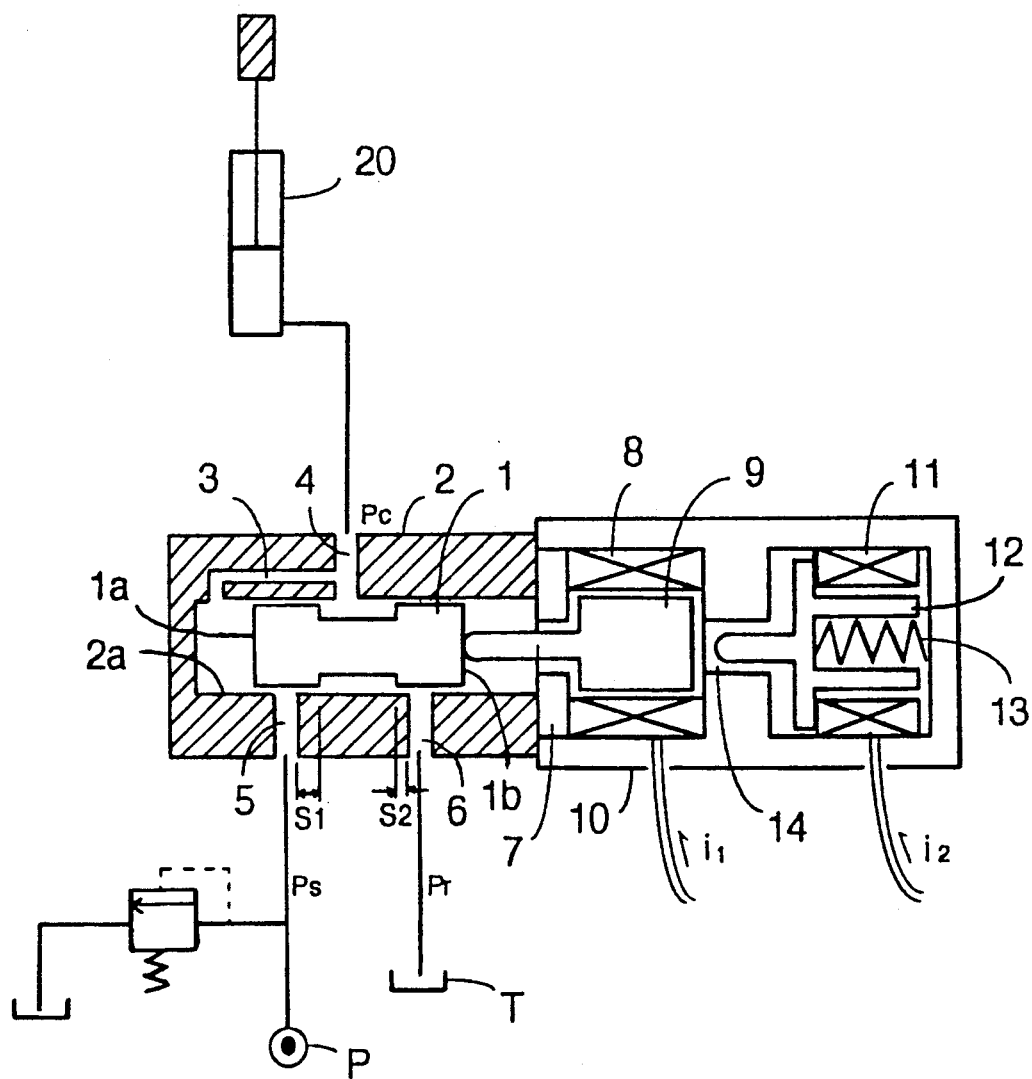
FIG. 1 is a vertical sectional view of an electromagnetic proportional reducing valve according to a first embodiment of this invention.

Referring to FIG. 1 of the drawings, a spool 1 is inserted in a hole 2a inside a valve housing 2 such that it can freely slide in the housing. A control port 4, supply port 5 connected to an oil source P and tank port 6 connected to a tank T open into this hole 2a, and the pressure Pc generated by the control port 4 is controlled according to the position of the spool 1.

A feedback oil passage 3 which branches off the control port 4 exerts the pressure Pc of the control port 4 on one end 1a of the spool 1.

A plunger 9 driven by a first solenoid 8 and a plunger 12 driven by a second solenoid 11, the second plunger being arranged coaxially and in series with the first plunger, are disposed in a case 10 connected to the value housing 2. A throughhole 14 facing the rear of the plunger 9 is formed in the case 10, the tip of the second plunger 12 being inserted in this throughhole 14.

When the solenoid 11 is magnetized, the second plunger 12 is held back against the force of a spring 13 such that it is not in contact with the first plunger 9.

However, when power to the solenoid 11 is interrupted, it moves forward due to the restoring force of the spring 13 so as to push the plunger 9 from the rear and thereby push the spool 1 to a predetermined position.

A control current $i_1$ which varies according to a target pressure value of the control port 4 is supplied to the first solenoid 8, and a constant current $i_2$, which is larger than the minimum current required to maintain the second plunger 12 held back against the force of the spring 13, is supplied to the second solenoid 11.

In the normal state, the second solenoid 11 which is magnetized by the current $i_2$ pulls the plunger 12 so that it is not in contact with the plunger 9.

The control current $i_1$ which varies according to the target pressure is applied to the first solenoid 8, and the plunger 9 displaces the spool 1 due to the driving force produced. A pressure dependent on the position of the spool 1 is thereby generated by the control port 4, and normal pressure reduction control is performed.

If the power to the first and second solenoids 8, 11 is interrupted due to an electrical fault or to any other reason, the spool driving force of the plunger 9 falls to zero, and the spool 1 is pushed back by the feedback pressure.

However, as the plunger 12 is no longer restrained by the solenoid 11, this plunger 12 moves forward due to the restoring force of the spring 13. The first plunger 9 is therefore returned by a predetermined force, and the spool 1 comes to rest at a position determined by the set force of the spring 13. As a result, the control pressure in the control port 4 does not fall to the tank port pressure Pr, and the pressure is maintained according to the position of the spool 1.

Even if the current is interrupted, the control port 4 maintains a constant pressure, and a hydraulic actuator 20 can continue to support a load by means of this pressure.

Further, even if the current is deliberately shut off when, for example, a device comprising the hydraulic actuator 20 also comprises other components and a fault is detected in these other components, the pressure of the hydraulic actuator 20 can be maintained.

On the other hand, if normal control is terminated, the pressure Pc of the control port 4 can be reduced to the pressure of the tank port 6. In other words, if power to the first and second solenoids is interrupted and the supply of actuating oil from the oil source P is simultaneously stopped, oil pressure does not appear at the supply port 5 even if the spool 1 is maintained at its predetermined position. The pressure Pc of the control port 4 is then equivalent to the pressure of the tank port 6.

If for example this hydraulic actuator 20 is used in a hydraulic unit which distributes the driving force in a torque split type vehicle having four wheel drive, and a fault occurs in the vehicle's electrical system, the minimum four wheel driving force can be maintained, and the driving force is distributed. This distribution would be in such a ratio that tight corner braking does not occur.

When the power supply to the first and second solenoids 8, 11 is resumed, the plunger 12 withdraws to a position at which it no longer interferes with the first plunger 9, the position of the spool 1 is determined only by the first plunger 9 which is displaced according to the control current $i_1$, and normal control is restored.

The pressure can be maintained simply by providing a second solenoid 11 as described hereintofore. This arrangement therefore constitutes a simple fail-safe mechanism without any need to provide a special pressure maintaining valve in the hydraulic circuit. Further, as this is achieved by providing a pressure reducing valve with a first and second solenoid in a coaxial arrangement, basic pressure reduction characteristics are exactly the same as in a pressure reduction valve according to the prior art, there is no risk that reliability of valve operation will be impaired, and the pressure reducing valve can be manufactured at low cost.

Figure 2:
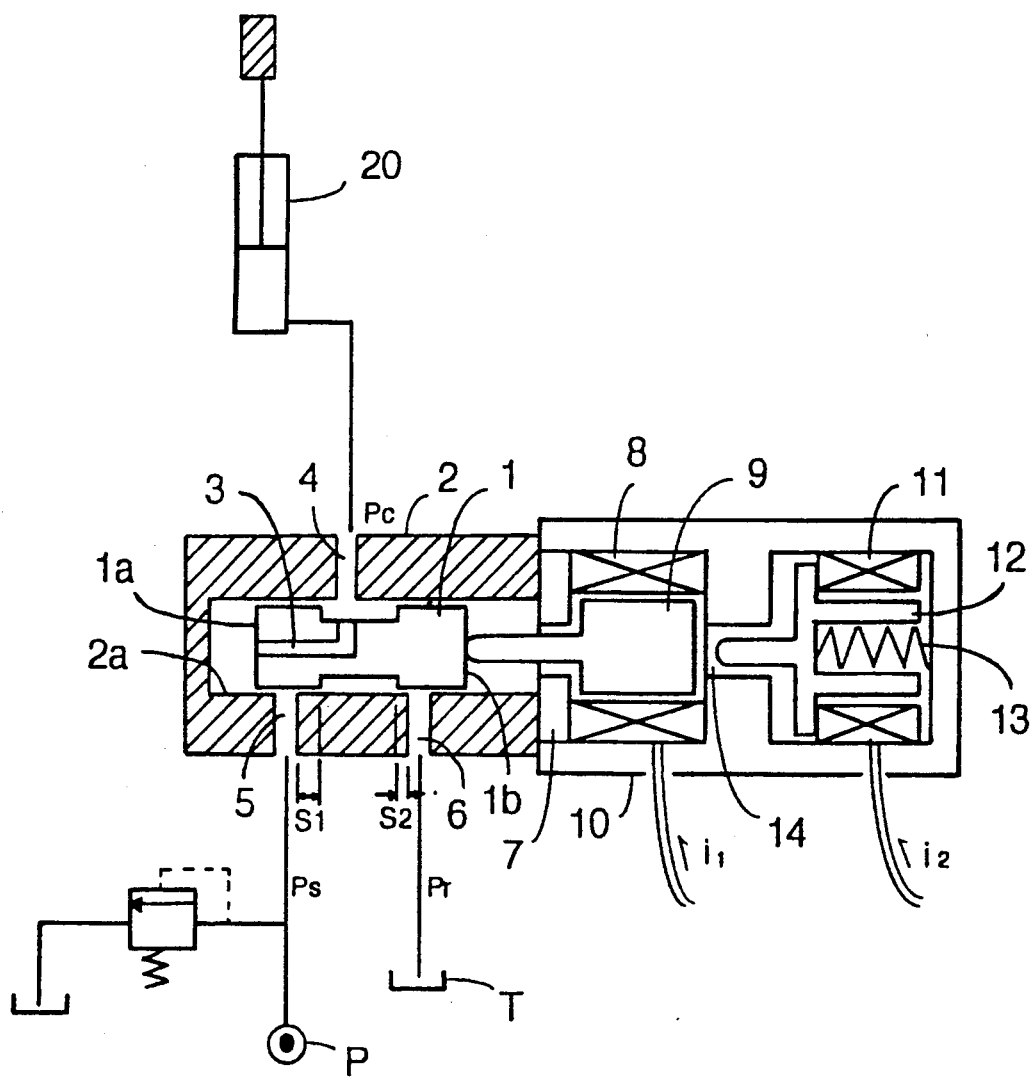
FIG. 2 is a vertical sectional view of an electromagnetic proportional reducing valve according to a second embodiment of this invention.

A second embodiment of this invention will now be described with reference to FIG. 2. According to this second embodiment, the feedback oil passage 3 which applies the pressure Pc generated by the control port 4 to the end 1a of the spool 1, passes right through the spool 1. There is thus no need to provide the feedback oil passage 3 in the housing 2, and the structure of the pressure reducing valve can be made more compact.

Figure 3:
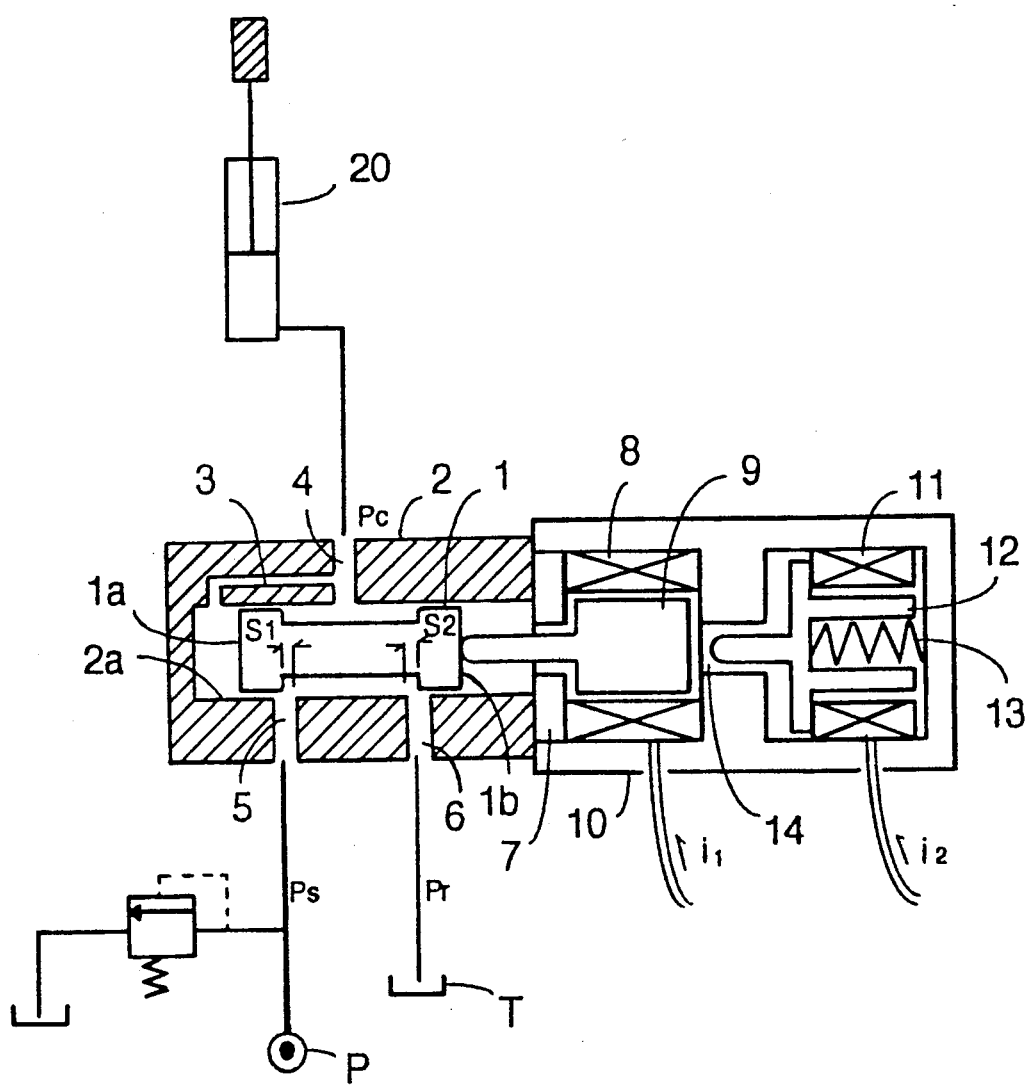
FIG. 3 is a vertical sectional view of an electromagnetic proportional reducing valve according to a third embodiment of this invention.

FIG. 3 shows a third embodiment of this invention. This valve has an "underlap" type of spool of which the sliding surface does not completely cover the supply port 5 and the tank port 6, and in this case also, the pressure Pc is controlled according to the position of the spool 1.

Figure 4:
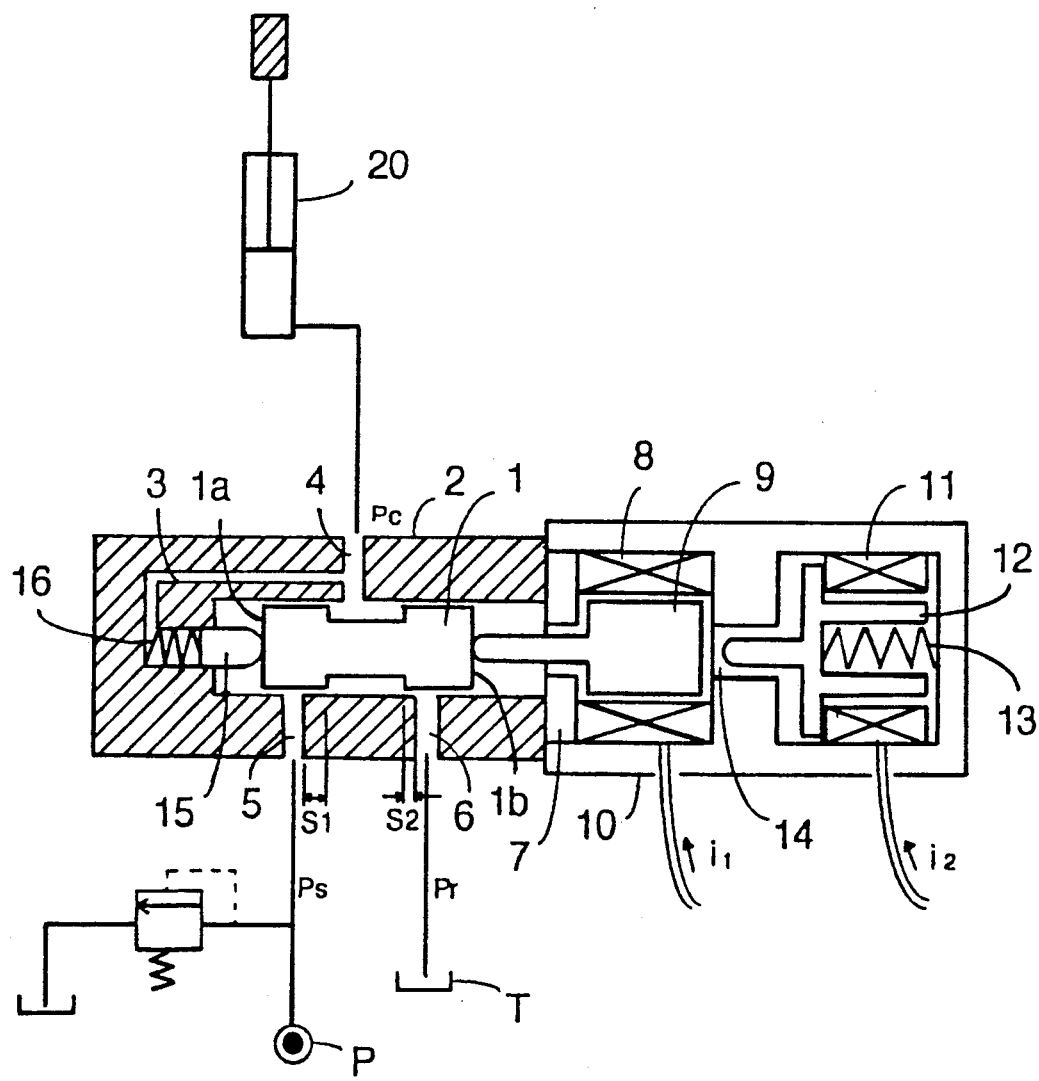
FIG. 4 is a vertical sectional view of an electromagnetic proportional reducing valve according to a fourth embodiment of this invention.
Figure 5:
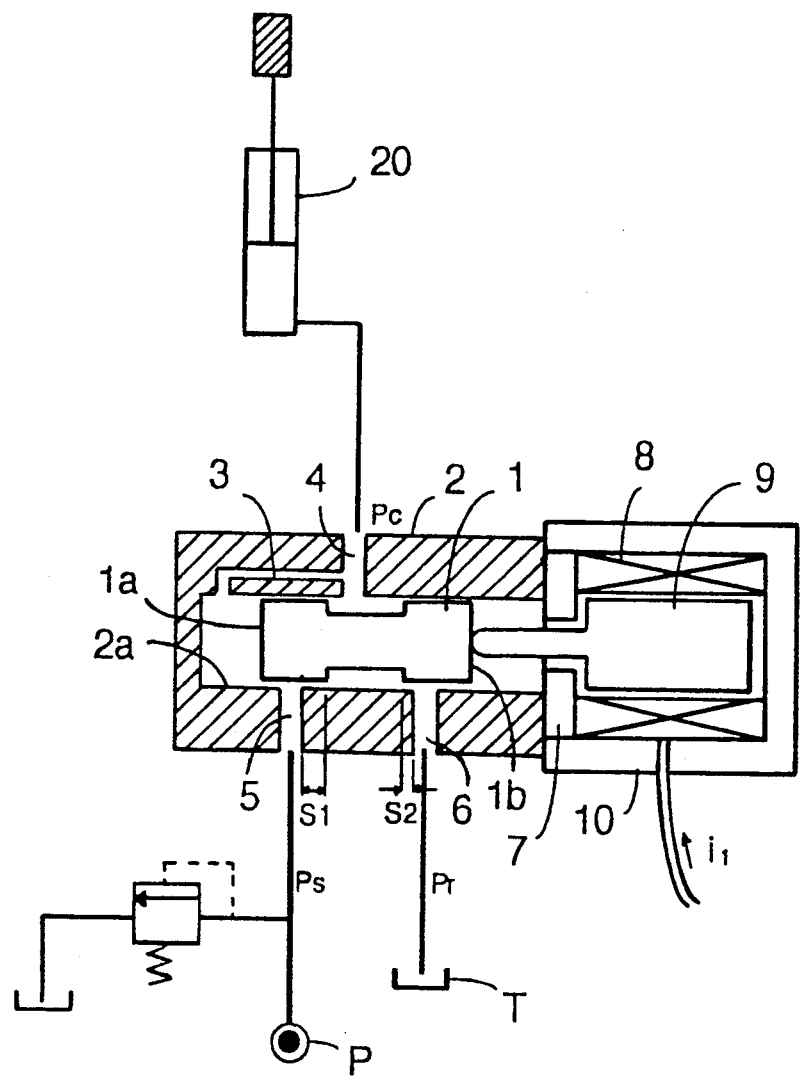
FIG. 5 is a vertical sectional view of an electromagnetic proportional reducing valve according to the prior art.

FIG. 4 shows a fourth embodiment of this invention wherein a reaction pin 15 having a pressure receiving surface area As less than the pressure receiving surface area Aa of the spool 1, is provided to apply the pushing force $F_2$ to the end 1a of the spool 1 according to the pressure Pc of the control port 4.

The pressure Pc of the feedback oil circuit 3 acts on the reaction pin 15, which then pushes the spool 1. In this case, if the pressure receiving surface area of the pin 15 is As, this pushing force $F_2$ is given by:

$$F_2 = Pc \times As \quad (3)$$

Since As<Aa, to oppose an identical driving force $F_1$, the generated control pressure Pc must be made larger. By using such a reaction pin 15, therefore, the driving force of the solenoid 8 required to generate the same pressure Pc is less, a smaller solenoid can be used, and the whole apparatus becomes more compact and economical. 16 is a return spring which maintains the reaction pin 15 in contact with the spool 1.

The foregoing description of the preferred embodiments for the purpose of illustrating this invention is not to be considered as limiting or restricting the invention, since many modifications may be made by those skilled in the art without departing from the scope of the invention.

The embodiments of this invention in which an exclusive property or privilege is claimed are defined as follows:

1. A pressure reducing valve comprising a supply port connected to an oil source, a tank port connected to a tank, a control port connected to a hydraulic actuator, a spool connecting said control port to said tank port depending on its axial position, a first plunger in contact with one end of said spool, a first solenoid which drives said first plunger axially by means of a driving force according to an magnetizing current provided, and a feedback oil passage for applying the pressure of said control port to the opposite end of said spool, wherein the pressure generated by said control port is increased and decreased according to the magnetizing current of said first solenoid, further comprising:

a second plunger arranged in series with said first plunger, a spring which pushes said second plunger in the direction of said first plunger, and a second solenoid for pulling said second plunger in opposition to the restoring force of said spring such that it is not in contact with said first plunger when said second solenoid is magnetized.

2. An electromagnetic proportional pressure reducing valve as defined in claim 1 wherein said feedback passage is formed in said spool.

3. A pressure reducing valve comprising a supply port connected to an oil source, a tank port connected to a tank, a control port connected to a hydraulic actuator, a spool connecting said control port to said tank port depending on its axial position, a first plunger in contact with one end of said spool, a first solenoid which drives said first plunger axially by means of a driving force according to a magnetizing current provided, and a feedback oil passage for applying the pressure of said control port to the opposite end of said spool, wherein the pressure generated by said control port is increased and decreased according to the magnetizing current of said first solenoid, further comprising:

a pin having a pressure receiving surface area smaller than that of said spool which receives pressure from said feedback passage so as to support said opposite end of said spool, a second plunger arranged in series with said first plunger, a spring which pushes said second plunger in the direction of said first plunger, and a second solenoid for pulling said second plunger in opposition to the restoring force of said spring such that it is not in contact with said first plunger when said second solenoid is magnetized.

* * * * *